May 15, 1934. L. W. THOMPSON 1,959,181
ELECTRICAL DISTRIBUTION SYSTEM
Filed May 3, 1933
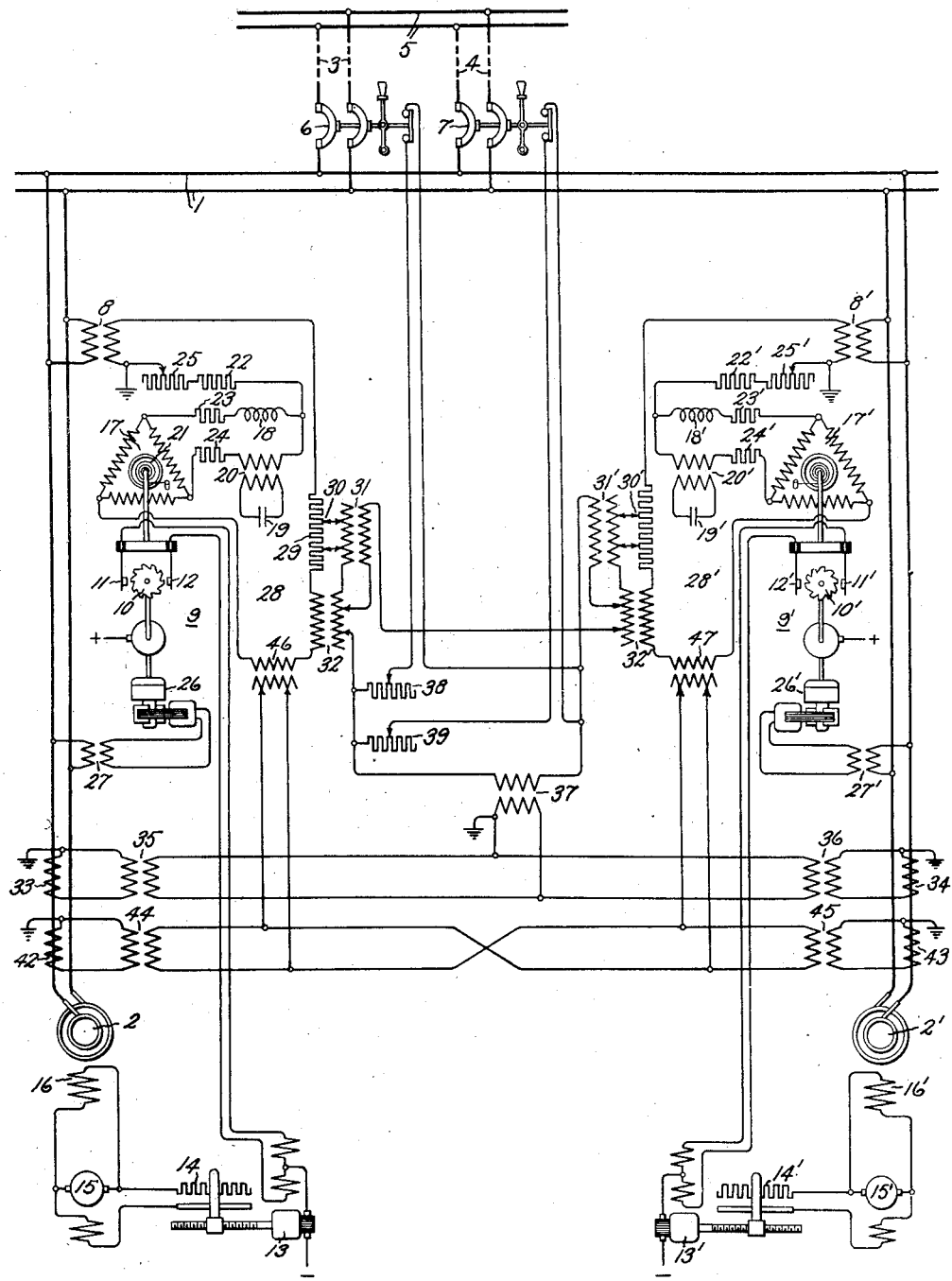
Inventor:
Louis W. Thompson,
by Chas. V. Tullar
His Attorney.

Patented May 15, 1934

1,959,181

UNITED STATES PATENT OFFICE 1,959,181

ELECTRICAL DISTRIBUTION SYSTEM

Louis W. Thompson, Schenectady, N. Y., assignor to General Electric Company, a corporation of New York Application May 3, 1933, Serial No. 669,171

7 Claims. (Cl. 171—224)

My invention relates to electrical distribution systems, and more particularly to automatic voltage regulation in electrical distribution systems.

For well known reasons it is usually desirable in electrical distribution systems to maintain the voltage constant at some particular point, such for example, as at a load bus. As the generators of most electrical distribution systems are relatively remotely situated with respect to the point at which it is desired to maintain constant voltage, it is usually the practice to provide the voltage regulators of the generators with devices known as line drop compensators, which in effect, recalibrate the voltage regulators in accordance with the load current in such a manner that the generator voltage varies with load current in just such a way as to compensate for the voltage drop in the conductors between the generator and the constant voltage point. It sometimes happens that the impedance of the transmission circuit, or feeder circuit, arrangement between the generator, or generators, of a distribution system and the constant voltage point, is variable. An example of such an arrangement is one in which the generators are connected to the constant voltage point through a variable number of parallel transmission, or feeder, circuits. Obviously, with such arrangements the transmission line voltage drop, for any given load, varies with the impedance of the transmission circuit arrangement; or, in the example given, with the number of circuits which are connected in parallel. The result is, that with an ordinary line drop compensating arrangement, constant voltage cannot be maintained at any predetermined point when the effective impedance of the circuits between the generator and this point is varied.

In accordance with my invention, I provide means for correlating the impedance of the transmission circuit arrangement with compensation produced by the line drop compensator in such a way that proper line drop compensation will be secured at all times regardless of the impedance of the transmission circuit. In this way, constant voltage may be held at any desired point in the distribution system.

An object of my invention is to provide a new and improved line drop compensating arrangement for electrical distribution systems.

Another object of my invention is to provide an improved system of voltage regulator control for parallel connected generators which are connected to a variable number of parallel connected load or feeder circuits.

My invention will be better understood from the following description taken in connection with the accompanying drawing and its scope will be pointed out in the appended claims.

In the accompanying drawing I have illustrated an embodiment of my invention as applied to two parallel connected single phase alternating current generators which are connected to supply power to a variable impedance transmission circuit arrangement consisting of a variable number of parallel load circuits. However, in the light of the following detailed description of my invention, it will become obvious to those skilled in the art that in its broader aspects my invention is not limited as to the number of generators employed, or the number of phases of the alternating current generators, or to alternating current generators at all, and that if desired, either one or more alternating current generators of any number of phases may be employed or the generators may be direct current generators. Similarly, it is immaterial to my invention in its broader aspects, as to how the impedance of the transmission circuit arrangement is varied. In practice, this variation in impedance may occur in a variety of well known ways, such for example, as by switching in or out series or parallel capacitors.

Referring now to the accompanying drawing in detail, I have shown a generator bus 1, to which are connected a pair of generators 2 and 2' which may be driven by any suitable prime movers (not shown). Also connected to generator bus 1 are a plurality of transmission, or feeder, circuits 3 and 4, which are connected in parallel between the generator bus and load bus 5. Individual circuit breakers 6 and 7 are provided for the circuits 3 and 4. Each of the generators is provided with similar voltage regulating equipment and consequently, only the equipment for generator 2 will be described in detail and the corresponding elements of the voltage regulating equipment for generator 2' will be designated by corresponding primed reference characters.

Connected by means of a potential transformer 8 to respond to the voltage of generator 2 is a voltage regulator 9, which may be of practically any type. As shown, this regulator consists essentially of a center contact 10 with which are adapted to cooperate "raise" and "lower" contacts 11 and 12 which are connected, respectively, to separate reversing field windings of a pilot motor 13 which is adapted to vary the value of a regulating resistance 14 in circuit with the field winding of an exciter 15 for the field winding 16 of generator 2. As indicated, center contact 10 is connected to the positive side of a source of supply current and motor 13 is connected to the negative side of this source, and the arrangement is such that when "raise" contact 11 engages center contact 10 motor 13 will be energized in such a manner as to rotate in a direction to decrease the value of resistance 14 and thereby increase the voltage of exciter 15 and consequently increase the voltage of generator 2. Similarly, when lower contact 12 engages center contact 10 motor 13 will be reversed, thereby causing a reduction in the voltage of generator 2. For moving contacts 11 and 12 there is provided a three phase torque motor 17 which is connected to the single phase secondary winding of the potential transformer 8 through a suitable phase splitting arrangement comprising an inductance 18 and a capacitance 19. As shown, capacitance 19 is connected in this energizing circuit through a transformer 20. The purpose of transformer 20 is to make it possible to select a volt-ampere ratio for capacitor 19 which will permit the use of a capacitor of desirable size or cost, or both, with the necessary volt-ampere rating. By means of the phase splitting arrangement, out of phase currents will flow in the phase windings of torque motor 17 whereby this motor may be made to produce a clockwise torque which is proportional to the voltage of generator 2. Arranged to oppose this torque is a suitable coil spring 21. Also connected in the energizing circuit for torque motor 17 are a plurality of resistances 22, 23 and 24 which are for the purpose of making the energizing circuit predominately resistive in character so that any changes in the reactance of the reactive elements of this circuit which might occur due to frequency changes, etc., will be negligible. Also connected in the energizing circuit is a variable resistor 25 which is provided for the purpose of adjusting or calibrating the regulator for the desired voltage to be held constant.

The reason that regulator 9 is shown as a three phase regulator when generator 2 is a single phase generator, is that as a practical matter most present day commercial alternating current generator voltage regulators are three phase regulators, and consequently it is more practical, because less expensive, to provide such regulators with suitable adapting means, such as the phase splitting means shown, so that they can be operated on single phase circuits, rather than constructing special single phase regulators.

Contact 10 is illustrated as of the rotary, or star wheel, type, and as shown this contact is rotated by means of a small alternating current motor 26 which is connected across generator 2 through a suitable potential transformer 27. With such a construction of contact 10, a desirable wiping action of the contacts is secured and also, due to the fact that the contact is irregular, the contact will be intermittently made and broken with the "raise" or "lower" contact, thereby providing an effective antihunting means.

With the above described regulator, if the voltage of generator 2 is above a predetermined normal value, the torque of motor 19 will overcome the restraining torque of spring 21 and "lower" contact 12 will engage center contact 10, thereby operating motor 13 in a manner to cause a reduction of the generator voltage. Similarly, if the voltage of generator 2 is below a predetermined normal value the torque of motor 17 will become less than the restraining torque of the spring 21 and "raise" contact 11 will engage center contact 10 thereby causing motor 13 to operate in a reverse direction with the result that the voltage of generator 2 is raised.

Also connected in circuit with the secondary winding of potential transformer 8 and the torque motor 17 is a line drop compensator 28 of any suitable type. The purpose of this compensator is to insert in the energizing circuit for the voltage regulator a voltage component which is proportional to the resistance voltage drop in the transmission circuit arrangement comprising circuits 3 and 4, and another voltage component which is proportional to the reactance voltage drop in the transmission circuit arrangement comprising the circuits 3 and 4. These voltage components will by definition be in quadrature with each other and by making their phase relations the same with respect to the secondary voltage of transformer 8 as the real voltage drop in the transmission circuit is with respect to the voltage of generator 2, they will produce such compensation that for any given power flow through the circuits 3 and 4 the voltage in generator 2 will be as much higher than normal voltage as the voltage drop in the circuits 3 and 4 with the result that the voltage at the load bus 5 will remain constant for any value of power through the circuits 3 and 4. The resistance component of the line drop compensator is produced by resistance 29 which is energized through suitable adjustable taps 30 from a current transformer 31. The reactance voltage drop component is produced by means of a special transformer 32 having a high magnetizing current and having a secondary winding connected in series with resistance 29 in circuit with the torque motor 17. The primary windings of transformers 31 and 32 are connected in series and are energized in accordance with load current in the following manner.

Connected respectively in circuit with generators 2 and 2′ are current transformers 33 and 34, which in turn are connected respectively to insulating transformers 35 and 36, whose secondary windings are connected in parallel to a totalizing or summating transformer 37. Through this arrangement the transformer 37 will carry a current which is proportional to the sum of the load currents of generators 2 and 2′. Connected in series with the secondary winding of totalizing transformer 37 are the primary windings of the two transformers of each line drop compensator 28 and 28′. Consequently, both line drop compensators are energized with a current which is proportional to the total current output of the two generators, and obviously this current is also proportional to the total current flowing in the transmission circuit arrangement comprising the feeder circuits 3 and 4.

However, all of the current of totalizing transformer 37 does not necessarily flow through the line drop compensators because the secondary winding of transformer 37 is shunted by a plurality of adjustable resistances 38 and 39 whose circuits are closed respectively through means associated with the circuit breakers 6 and 7 or with their control, such for example as back contacts, or interlocks, on these breakers.

The operation of my invention is substantially as follows. With the elements in the positions they are shown in the drawing and assuming that generators 2 and 3 are being operated by means of suitable prime movers (not shown) the voltage regulators 9 and 9' will be maintaining substantially constant terminal voltage of their respective generators in the manner already described. Load currents will be flowing through generator bus 1 to the circuits 3 and 4 and through circuit breakers 6 and 7 to the load bus 5, thereby producing a voltage drop in circuits 3 and 4. By means of the totalizing transformer 37 and by proper adjustment of resistances 38 and 39 and the taps on the line drop compensators, the current which is circulated in the line drop compensators 28 and 28' may be made such that the compensating voltage components which are inserted in the energizing circuits for the voltage regulators will just compensate the regulators for voltage drop in the transmission circuits 3 and 4 and consequently constant voltage will be held on load bus 5 regardless of the value of the load current which flows. If now, one of the circuit breakers 6 or 7 is opened, shunting resistances 38 or 39 will be open circuited with the result that an increased current will flow through the line drop compensators. I have found that this is necessary because, for a given load current, if one of the circuits 3 or 4 is open circuited this load current all flowing through one circuit will produce a much greater voltage drop between busses 1 and 5 and consequently it is necessary to provide a greater amount of line drop compensation. By proper adjustment of resistances 38 and 39 the arrangement can be made such that the change in current flowing through the line drop compensators when one or more circuit breakers is open will just be sufficient to correct for the change in effective impedance of the transmission circuit arrangement comprising the new number of transmission circuits.

Although I have only shown two parallel circuits 3 and 4, it will be obvious that my invention may be extended to any number of parallel circuits, each having its individual circuit breaker with its interlock or back contacts for controlling an individual shunting resistance across the secondary winding of the totalizing transformer 37.

It should also be obvious to those skilled in the art, that while I have shown a particular totalizing arrangement for energizing the line drop compensators, my invention in no wise is limited to this particular arrangement shown, and that in its broader aspects, my invention includes the correlation of the energization of the line drop compensators to the effective impedance of the transmission circuit arrangement in any way so that regardless of the impedance of the transmission circuit arrangement the desired line drop compensation will always be secured. Thus, for example, my invention does not depend on such obvious changes as the omission of insulating transformers 35 or 36 or the totalizing of the current in the transmission circuits instead of in the generators.

As generators 2 and 2' are shown parallel connected, it is desirable to provide cross compensation means or means for preventing circulating currents flowing in the generators. Circulating currents are always wattless currents and are produced by very slight differences in the terminal voltage of the generators. A simple way of securing such compensation is by means of a differential current transformer arrangement. As shown, current transformers 42 and 43 are connected respectively in circuit with generators 2 and 2' and connected respectively thereto are insulating transformers 44 and 45 whose secondary windings are cross or differentially connected. Connected across these insulating transformers are reactance compensators 46 and 47 which are connected respectively in the energizing circuit for the torque motors 17 and 17'. These reactance compensating devices are similar to transformers 32 and 32' and consist essentially of special transformers having very high magnetizing currents.

With such a compensating arrangement the transformers 46 and 47 will be energized in accordance with any circulating current in the two generators, which current will be of opposite phase with respect to the terminal voltage in each generator. Thus, if the voltage of generator 2 is higher than the voltage of generator 2' the circulating current will be lagging with respect to the voltage of generator 2 and leading with respect to the voltage of generator 2', while if the voltage of generator 2 is higher than the voltage of generator 2' the circulating current will be lagging with respect to the voltage of generator 2' and leading with respect to the voltage of generator 2. Consequently, the resultant currents produced by the differential or cross connection of transformers 44 and 45 will be opposite in phase, depending upon which generator has the higher voltage. By connecting reactance compensators 46 and 47 in the proper manner to the cross connected transformers 44 and 45 voltages may be produced in the energizing circuits for the voltage regulators which are such that for any given circulating current the compensating voltages will act to cause the voltage regulators to change the voltage of each generator in such a manner as to minimize and reduce to substantially zero any circulating currents produced by a voltage difference.

While I have shown and described particular embodiments of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an electrical power transmission circuit arrangement having a variable effective impedance, an adjustable voltage source of current supply connected to said transmission circuit arrangement, line drop compensating means for said source of supply, and means for correlating the amount of line drop compensation produced by said compensating means with the effective impedance of said transmission circuit arrangement.

2. In combination, a generator, a load, a plurality of parallel circuits for connecting said generator to said load, circuit breakers in said circuits, line drop compensating means for said generator, and means operated concurrently with the operation of said circuit breakers for varying the amount of compensation produced by said compensating means.

3. In combination, a plurality of parallel connected generators, a load circuit, a plurality of parallel circuits for connecting said generators to said load circuit, circuit breakers in said parallel circuits, line drop compensating means for said generators, and means actuated substantially simultaneously with the closing of each of said circuit breakers for reducing the amount of line drop compensation produced by said compensating means.

4. In combination, a plurality of parallel connected alternating current generators, automatic voltage regulators for said generators, line drop compensators for said regulators, means for reducing the circulating current in said generators to a minimum, and means responsive to the total current of said generators for energizing said line drop compensators.

5. In combination, a plurality of parallel connected generators, a plurality of parallel connected load circuits connected to said generators, automatic voltage regulators for said generators, line drop compensators for said regulators, means for causing said regulators to reduce circulating currents in said generators to a minimum, and means for energizing said line drop compensators in accordance with the sum of the currents of said generators.

6. In combination, a plurality of parallel connected alternating current generators, a plurality of parallel load circuits, means for selectively connecting said circuits to said generators, automatic voltage regulators for said generators, line drop compensators for said generators, means responsive to a circulating current in said generators for causing said regulators to adjust the voltage of said generators so as to eliminate such a current, means for producing a totalized current proportional to the sum of the load currents of each generator, and circuit connections for energizing said line drop compensators in accordance with said totalized current.

7. In combination, a generator bus, a plurality of alternating current generators connected in parallel to said bus, a load bus, a plurality of circuits connected in parallel between said busses, an individual circuit breaker in each of said circuits, an individual voltage regulator for each of said generators, an individual line drop compensator for each of said generators, means including said voltage regulators for minimizing circulating currents in said generators, totalizing means responsive to the load current of each generator for producing a current proportional to the sum of said load currents, means for energizing said line drop compensators from said totalizing means, means for controlling the position of said circuit breakers, and means responsive to said controlling means for varying the proportion of the current of said totalizing means which energizes said compensators.

LOUIS W. THOMPSON.